J. TRUESDELL.
FASTENING DEVICE.
APPLICATION FILED FEB. 12, 1916.
1,196,617.
Patented Aug. 29, 1916.
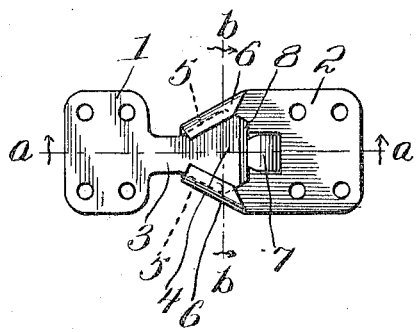
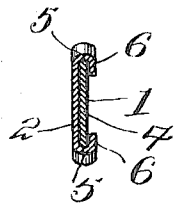
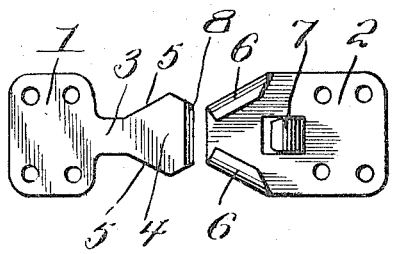
Inventor
John Truesdell,
By Victor J. Evans
Attorney
Witnesses

UNITED STATES PATENT OFFICE.

JOHN TRUESDELL, OF COLORADO SPRINGS, COLORADO.

FASTENING DEVICE.

1,196,617.  Specification of Letters Patent.  Patented Aug. 29, 1916.

Application filed February 12, 1916. Serial No. 77,909.

*To all whom it may concern:*

Be it known that I, JOHN TRUESDELL, a citizen of the United States, residing at Colorado Springs, in the county of El Paso and State of Colorado, have invented new and useful Improvements in Fastening Devices, of which the following is a specification.

This invention is an improved fastener for use on corsets, garters, trousers, and other articles, the object of the invention being to provide an improved device of this character which is cheap and simple, is strong and durable, which may be readily fastened and unfastened and which is provided with means to prevent the fastener from becoming casually disengaged.

The invention consists in the construction, combination and arrangement of devices hereinafter described and claimed.

In the accompanying drawings:—Figure 1 is an elevation of a fastener constructed in accordance with my invention, showing the same fastened or engaged. Fig. 2 is a longitudinal sectional view of the same on the plane indicated by the line *a—a* of Fig. 1. Fig. 3 is a similar view on the plane indicated by the line *b—b* of Fig. 1. Fig. 4 is an elevation of the fastener, with its members disengaged.

My improved fastener may be made of sheet metal, wire, or any suitable material. It is here shown as made of sheet metal. The fastener comprises a pair of members 1—2. The member 1 is formed with a narrowed stem 3 at its outer end and with a head 4 at the outer end of said stem, the head being substantially triangular in form and provided with sides 5 which converge toward the stem.

The member 2 is adapted to receive the head of the member 1 and is provided with a pair of converging keepers 6 for engagement by the sides 5 of the head and is also provided with a locking tongue 7 to engage behind the head at the outer end thereof and thereby prevent the head from becoming casually detached from the keepers and the member 2. The keepers are here shown as bent from the plate which forms the member 2 and as providing grooves for engagement by the sides 5 of the head and the locking tongue is shown as struck up from the said member 2 and is springy or resilient to enable it to be readily slipped and engaged behind the head. The outer end of the head is beveled preferably, as at 8 to facilitate its engagement by the locking tongue.

It will be understood from the foregoing description and by reference to the drawings that owing to the provision of the locking tongue for coaction with the keepers in holding the head, the latter is prevented from being casually disengaged altogether and the keeper permits the ready disengagement of the head, by intent, when the head is turned outwardly, at an angle to the member 2. When a number of my fastening devices are used and closely related to one another as on a corset or the like, each will stay fastened when engaged and avoid the annoyance, now so common, of having one fastener disengaged when another is fastened.

Having thus described my invention, I claim:—

A fastener of the class described comprising a pair of members, one having a head provided with converging sides, the other member being adapted to receive the head, having converging members to engage the converging sides of the head and also having a spring locking tongue provided with a raised free end to engage behind the head, and permit movement of the head toward the base of the tongue to disengage the sides of the head from the converging members.

In testimony whereof I affix my signature in presence of two witnesses.

JOHN TRUESDELL.

Witnesses:
 GEO. M. IRWIN,
 E. B. BEESON.

Copies of this patent may be obtained for five cents each, by addressing the "Commissioner of Patents, Washington, D. C."